(12) United States Patent
Maruhashi et al.

(10) Patent No.: US 8,248,303 B2
(45) Date of Patent: Aug. 21, 2012

(54) RADIO CONTROL METHOD

(75) Inventors: Kenichi Maruhashi, Tokyo (JP); Naoyuki Orihashi, Tokyo (JP)

(73) Assignee: NEC Corporation, Tokyo (JP)

( * ) Notice: Subject to any disclaimer, the term of this patent is extended or adjusted under 35 U.S.C. 154(b) by 245 days.

(21) Appl. No.: 12/524,088

(22) PCT Filed: Jan. 21, 2008

(86) PCT No.: PCT/JP2008/050683
§ 371 (c)(1),
(2), (4) Date: Jul. 22, 2009

(87) PCT Pub. No.: WO2008/090836
PCT Pub. Date: Jul. 31, 2008

(65) Prior Publication Data
US 2010/0026575 A1 Feb. 4, 2010

(30) Foreign Application Priority Data
Jan. 23, 2007 (JP) ................................. 2007-012449

(51) Int. Cl.
*H01Q 3/00* (2006.01)
*G01S 5/04* (2006.01)
(52) U.S. Cl. ........................................ 342/372; 342/432
(58) Field of Classification Search .................... 342/81, 342/154, 368, 372, 373, 432
See application file for complete search history.

(56) References Cited

U.S. PATENT DOCUMENTS

| | | | | |
|---|---|---|---|---|
| 6,768,913 B1 * | 7/2004 | Molnar et al. | ............. | 455/562.1 |
| 7,062,246 B2 * | 6/2006 | Owen | ........................ | 455/277.1 |
| 7,312,750 B2 * | 12/2007 | Mao et al. | ..................... | 342/377 |
| 2003/0228887 A1 * | 12/2003 | Kishigami et al. | ............ | 455/561 |

FOREIGN PATENT DOCUMENTS

| | | |
|---|---|---|
| JP | 1998042352 A | 2/1998 |
| JP | 1998070504 A | 3/1998 |
| JP | 1998126831 A | 5/1998 |
| JP | 2000165959 A | 6/2000 |
| JP | 2000307494 A | 11/2000 |
| JP | 2002152108 A | 5/2002 |
| JP | 2002232341 A | 8/2002 |
| JP | 2004072539 A | 3/2004 |
| JP | 2004194065 A | 7/2004 |
| JP | 2004214864 A | 7/2004 |
| JP | 2004297750 A | 10/2004 |
| JP | 2002100917 A | 4/2005 |

(Continued)

OTHER PUBLICATIONS

Japanese Office Action for JP2008-555045 dated Jul. 6, 2011.

(Continued)

*Primary Examiner* — Dao Phan

(57) ABSTRACT

Provided is a radio control method for a radio communication being performed in a beam direction that is set on the basis communication quality basis, including a step of acquiring a data string formed of at least a beam direction and communication quality in the beam direction; and a step of sequentially assigning a priority rank for setting the beam direction for performing the radio communication from the beam direction in which the highest communication quality is obtained, according to the data string. In the step of assigning a priority rank, no priority rank is assigned to the beam direction adjacent to the beam direction to which a priority rank has been already assigned or to the beam direction in the vicinity containing the adjacent beam direction.

11 Claims, 7 Drawing Sheets

FOREIGN PATENT DOCUMENTS

| | | |
|---|---|---|
| JP | 2005525756 A | 8/2005 |
| JP | 2006042381 A | 2/2006 |
| JP | 2006245986 A | 9/2006 |
| KR | 2002-0026606 A | 4/2002 |
| WO | 2005089362 A | 9/2005 |

OTHER PUBLICATIONS

International Search Report for PCT Application No. PCT/JP2008/050683, Apr. 22, 2008, NEC Corp.

Japanese Office Action for JP2008-555045 dated Apr. 19, 2011.

International Search Report for PCT/JP2008/050683 mailed Apr. 22, 2008.

K. Maruhashi et al., "60-GHz-band LTCC Module Technology for Wireless Gigabit Transceiver Applications", RFIT2005, IEEE International Workshop on Radio-Frequency Integration Technology, pp. 131-134, Nov. 30-Dec. 2, 2005.

K. Ohata et al., "1.25Gbps Wireless Gigabit Ethernet Link at 60 GHz-Band", IEEE MTT-S International Microwave Symposium, Digest, pp. 373-376, Jun. 2003.

J. F. Buckwalter et al., "An Integrated Subharmonic Coupled-Oscillator Scheme for a 60-GHz Phased-Array Transmitter", IEEE Transactions on Microwave Theory and Techniques, vol. 54, No. 12, pp. 4271-4280, Dec. 2006.

S. Alalusi et al., "A 60GHz Phased Array in CMOS", IEEE 2006 Custom Integrated Circuits Conference, pp. 393-396, San Jose, Sep. 2006.

Korean Office Action for KR10-2009-7017493 issued Oct. 28, 2011.

\* cited by examiner

| beam direction ID# | adjacent beam direction ID# | communication quality |
|---|---|---|
| 1 | 2, 5, 6 | 9 |
| 2 | 1, 3, 6 | 5 |
| 3 | 2, 4, 7 | 1 |
| 4 | 3, 7, 5 | 4 |
| ⋮ | ⋮ | ⋮ |
| 16 | 11, 12, 15 | 1 |

Fig.12

| wide angle beam direction ID# | receiving level (wide angle beam) | narrow angle beam direction ID# | communication quality |
|---|---|---|---|
| W1 | 9 | W1-N3 | 9 |
| W2 | 3 | W2-N16 | 3 |
| W3 | 1 | — | — |
| W4 | 4 | W4-N1 | 6 |
| ⋮ | ⋮ | ⋮ | |
| W8 | 1 | — | — |

Fig.13

| transmitter | | receiver | | communication quality | weighting communication quality |
|---|---|---|---|---|---|
| beam direction ID# | weighting set at the angle from ID#1 | beam direction ID# | weighting set at the angle from ID#3 | | |
| 1 | — | 3 | — | 9 | — |
| 2 | 0.2 | 8 | 0.2 | 5 | 1.0 |
| 3 | 0.6 | 31 | 0.6 | 1 | 1.2 |
| 4 | 0.8 | 12 | 0.8 | 4 | 3.2 |
| ⋮ | ⋮ | ⋮ | ⋮ | ⋮ | |
| 16 | 0.6 | 22 | 0.6 | 1 | 0.6 |

RADIO CONTROL METHOD

This application is the National Phase of PCT/JP2008/050683, filed Jan. 21, 2008, which is based upon and claims priority to Japanese Patent Application No. 2007-012449, filed on Jan. 23, 2007, the contents of which are incorporated herein by reference in its entirety.

TECHNICAL FIELD

The present invention relates to a radio control method for a radio communication being performed in a beam direction that is set on the basis of communication quality.

BACKGROUND ART

Recently, radio communication devices using wideband millimeter waves of 30 GHz to 300 GHz have become widespread. A radio communication technique using a millimeter wave is specifically applicable to radio transmission of high definition images or gigabit level high speed radio data communication. For example, the technique is disclosed in K. Maruhashi et al., "60-GHz-band LTCC Module Technology for Wireless Gigabit Transceiver Applications", IEEE International Workshop on Radio-Frequency Integration Technology, Digest, pp. 131-134, December 2005, and K. Ohata et al., "1.25 Gbps Wireless Gigabit Ethernet Link at 60 GHz-band", IEEE MTT-S International Microwave Symposium, Digest, pp. 373-376, June 2003.

However, a high frequency millimeter wave has a good property for advancing in a straight line and this may cause problems when radio transmission is tried within an indoor area. In addition, the millimeter wave has drawbacks in that a significant signal attenuation is caused due to the human body or the like. This may cause a difficulty in transmission, say, shadowing, and thus result in over-the-horizontal communication in cases where a human body exists between a transmitter and a receiver within an indoor area. The shadowing problem results from changes in propagation environments caused due to the high frequency of the radio wave and radio wave having a good property for advancing in a straight line, and is not limited to a millimeter wave band (having a frequency of 30 GHz or higher). Although it is not clear, the frequency at which the above-mentioned changes in propagation environments occurs is known as the level of approximately 10 GHz. Meanwhile, according to "Propagation data and prediction methods for the planning of indoor radio communication systems and radio local area networks in the frequency range 900 MHz to 100 GHz," ITU-R, P.1238-3, April 2003, power loss coefficient indicates the volume of attenuation of wave with respect to the distance during propagation ranges 28 to 32 for the frequency range 0.9 GHz to 5.2 GHz, while the coefficient is 22 for the frequency of 60 GHz within an office. Since the coefficient is 20 in case of free space loss, it seems that propagation is affected less by scattering or diffraction at a high frequency, for example, 60 GHz.

To overcome the above-described drawbacks, for example, Japanese Patent Application Laid-Open No. 2006-245986 discloses, as shown in FIG. 1, a system in which a plurality of receiving parts 123 and 124 are arranged in receiving device 122 so as to form a plurality of transmission lines between transmitting device 121 and receiving parts 123 and 124, and transmission can be performed through one of the transmission lines even when the other transmission line is blocked.

As another solution to the above-mentioned drawbacks, Japanese Patent Application Laid-Open No. 2000-165959 discloses a system in which a reflector is mounted on a wall or a ceiling and a number of transmission lines are provided.

The method disclosed in Japanese Patent Application Laid-Open No. 2006-245986 is not available in cases where the vicinity of the transmitting device is blocked or where the receiving parts are all blocked. Moreover, the method disclosed in Japanese Patent Application Laid-Open No. 2000-165959 necessitates particular user consideration, for instance, the reflector should be disposed, taking into consideration the arrangement of the transmitter and the receiver.

However, a recent study on propagation characteristics of millimeter waves has found that there is a possibility of using a reflected wave even when no reflector is installed by intent.

FIG. 2 illustrates a system configuration using a wide angle antenna, and FIG. 3 illustrates an indoor delay profile of the system using the wide angle antenna shown in FIG. 2.

In the system using the wide angle antenna shown in FIG. 2, the principal wave which has arrived first has the largest received power, as shown in FIG. 3. The delayed waves including second and third waves arrived thereafter have small received power. These second and third waves are those reflected from a ceiling or a wall. This situation is significantly different from the propagation environments of radio waves of 2.4 GHz have a poor property for advancing in a straight line and that are used in a local area network, for example. At the frequency of 2.4 GHz, it is not easy to clearly isolate the arrival direction of radio wave due to effects of diffraction and multiple reflection. In the meantime, for a millimeter wave having a good property for advancing in a straight line, the arrival direction of wave is relatively clear, however, the number of delayed waves is restricted and a receiving level thereof is low.

Therefore, in case where a direct wave is blocked, it is required that a receiving level is ensured in the direction of reflecting a narrow beam having a high directive gain in order to continuously perform transmission using a reflected wave, as shown in FIG. 4. To eliminate user concern in regard to blockage of radio waves or concern about being positioned between a transmitter and a receiver, there is a need for a beam forming technique for dynamically controlling a narrow beam.

For beam forming, an array antenna needs to be constructed. An array antenna can be provided in a small area with the millimeter wave of short wavelength (for example, 5 mm at the frequency 60 GHz), and a phase shifter array or an oscillator array for such an array antenna is developed. For example, the technique is disclosed in J. F. Buckwalter et al., "An Injected Subharmonic Coupled-Oscillator Scheme for a 60-GHz Phased-Array Transmitter", IEEE Transactions on Microwave Theory and Techniques, Vol. 12, pp. 4271-4280, December 2006, and S. Alausi et al., "60 GHz Phased Array in CMOS", IEEE 2006 Custom Integrated Circuits Conference, Digest, pp. 393-396, San Jose, September 2006.

In an indoor millimeter wave system, problems arise when a direct wave is blocked and when radio transmission is continuously performed by a reflected wave.

It is desirable to reduce a data transmission interrupt time when the wave that is in use, whether it is a direct wave or a reflected wave, is converted. This is particularly desirable in the transmission of non-compressed image data, requested to have real-time property. In case of using a reflected wave, it is required to increase the directive gain of an antenna by narrowing antenna beam width to improve receiving intensity.

However, as antenna beam width becomes narrower, the beam searching direction (step) increases, and searching for and setting the beam direction takes time, thereby increasing the data transmission interrupt time. Accordingly, there exists a strong need for a method of setting a beam direction which can reduce data transmission interrupt time. In the meantime, a device capable of buffering data necessitates an extremely large memory when a data transmission interrupt time is increased, resulting in impracticality.

DISCLOSURE OF THE INVENTION

Therefore, it is an object of the present invention to provide a radio control method capable of reducing data transmission interrupt time by shortening the time taken for searching or setting the beam direction when radio communication is performed through beam forming.

A radio control method for a radio communication being performed in a beam direction that is set on the basis of communication quality, includes a step of acquiring a data string formed of at least a beam direction and communication quality of the beam direction, and a step of sequentially assigning a priority rank for setting the beam direction for performing the radio communication from the beam direction in which the highest communication quality is obtained, according to the data string, wherein the step of assigning a priority rank does not assign priority rank to, or lowers the priority rank of the beam direction adjacent to the beam direction to which a priority rank has already been assigned, or to the beam direction in the vicinity where the adjacent beam direction is present.

In addition, a radio control method for a radio communication being performed in a beam direction that is set on the basis of communication quality, includes a step of acquiring a data string formed of at least a beam direction and communication quality of the beam direction, a step of assigning a highest priority rank for setting the beam direction for performing the radio communication in a first beam direction in which the highest communication quality can be obtained, according to the data string, and a step of assigning a priority rank to the beam direction according to weighting communication quality obtained from, a weighting coefficient which is set lower, as the angle, with respect to the first beam direction, becomes smaller, and the communication quality.

In addition, a radio control method for a radio communication being performed by either a transmitter or a receiver in a beam direction that is set on the basis of communication quality, includes transmitting information defines at least a plurality of beam directions and information that defines angles of each beam direction from the transmitter to the receiver or from the receiver to the transmitter.

The above-described radio control method makes it possible to search and set a beam direction for obtaining superior communication quality in a short time when radio communication is carried out by beam forming.

BRIEF DESCRIPTION OF DRAWINGS

FIG. 12 shows a table of data string acquired from the process shown in FIG. 11; and FIG. 13 shows a table of data string set in a communication control method according to the fourth exemplary embodiment of the present invention.

BEST MODE FOR CARRYING OUT THE INVENTION

Exemplary embodiments of the present invention will be explained hereinafter with reference to the accompanying drawings.

The First Exemplary Embodiment

Figure 1:
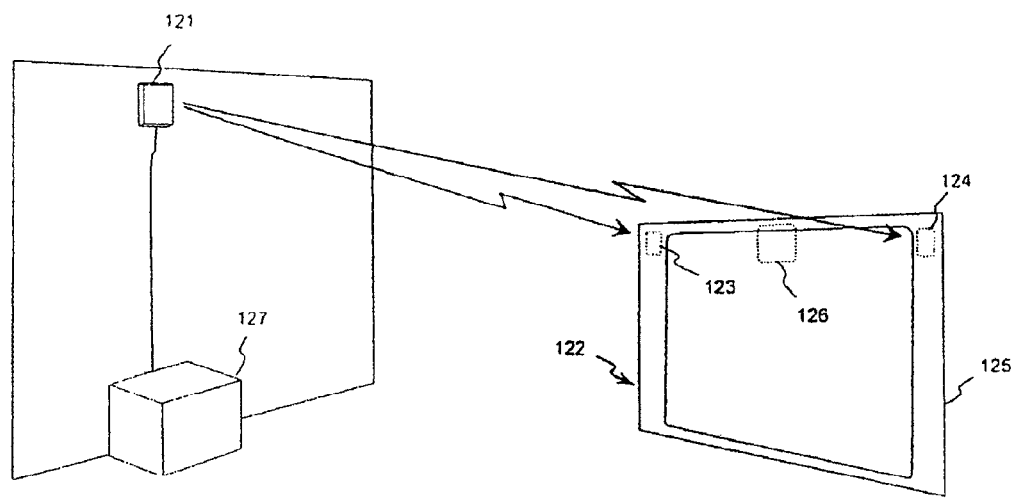
FIG. 1 is a view showing an example of an outdoor system using a millimeter wave.
Figure 2:
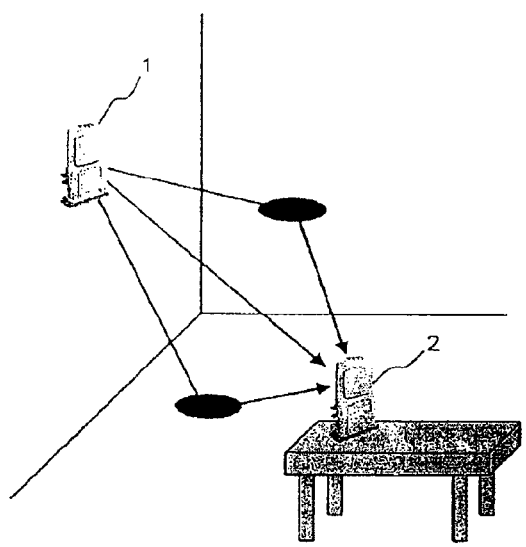
FIG. 2 is a view showing a system configuration using a wide angle antenna.
Figure 3:
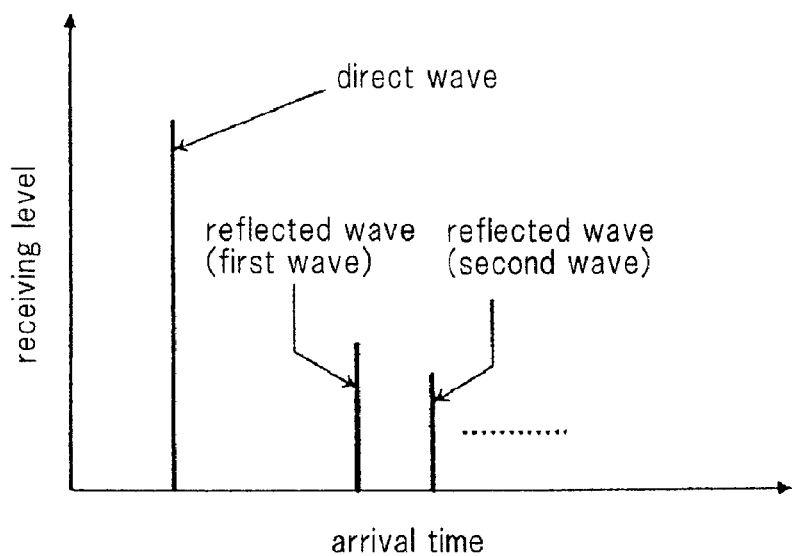
FIG. 3 is a view showing an example of a delay profile in the indoor area of the system using a wide angle antenna shown in FIG. 2.
Figure 4:
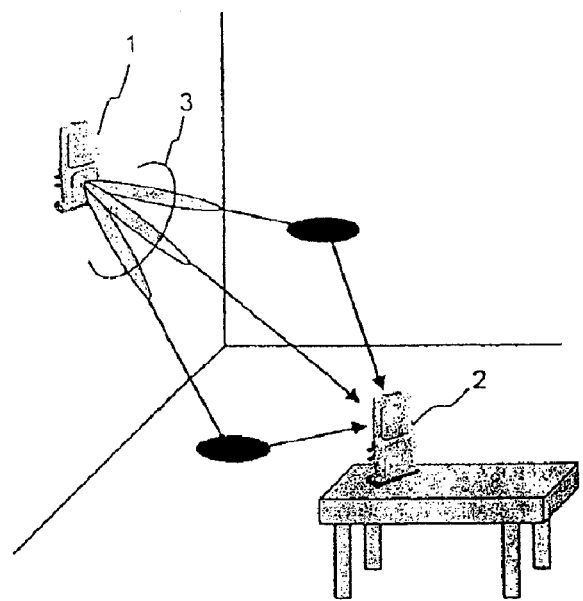
FIG. 4 is a view showing a system configuration using a narrow angle beam.
Figures 5, 6:
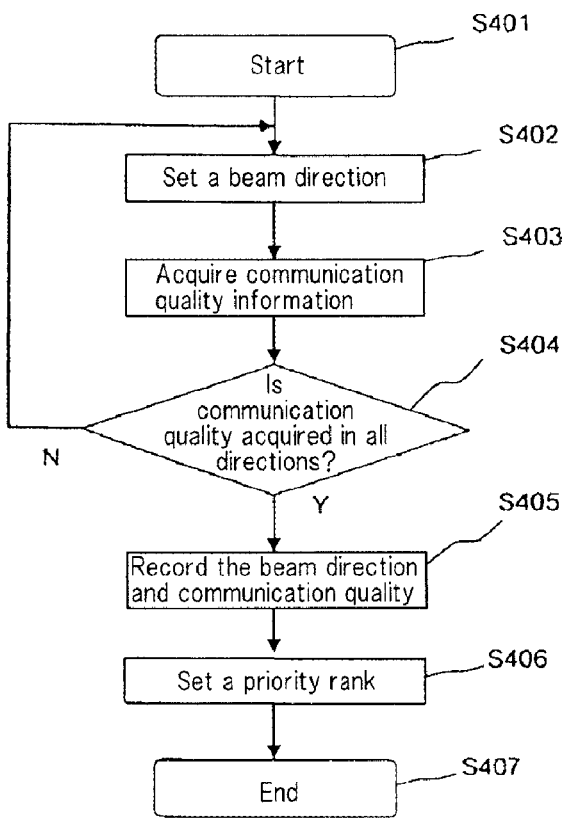
FIG. 5 is a flowchart showing a process of a radio control method according to the first exemplary embodiment of the present invention.
FIG. 6 shows a table of data string acquired from the process shown in FIG. 5.

FIG. 5 is a flowchart showing a process of a radio control method according to the first exemplary embodiment of the present invention, in which steps for setting a beam direction for a radio communication and for investigating communication quality in the thus-investigated beam direction are shown.

In the radio control method in the first exemplary embodiment of the present invention, a process starts in step 401, and a beam direction is set in step 402. Subsequently, communication quality information in the set beam direction is acquired in step 403. In step 404, steps 402 and 403 are repeated until communication quality is obtained in all directions of beam control.

In step 405, the result is recorded as a data string constituted by the beam direction and communication quality in the beam direction.

FIG. 6 shows a table of data string acquired from the process shown in FIG. 5.

As shown in FIG. 6, a data string constituted by beam direction ID# as beam direction ID numbers for specifying beam directions and communication quality in those directions is acquired and recorded. In addition, adjacent beam direction ID# are matched to the respective beam direction ID numbers (ID#).

In step 406, according to the data string shown in FIG. 6, a priority rank is assigned to beam directions in order to set the beam directions that are required for carrying out radio communication. Here, the beam direction having the highest communication quality is assigned with priority rank 1 (beam direction ID number #=1 in FIG. 6), and assignments are made in order, according to communication quality. However, no priority rank is assigned to the beam direction adjacent to the beam direction in which a priority rank has been already assigned, or the priority rank of the beam direction which is not adjacent to the beam direction is lowered. Referring to FIG. 6, even though beam direction ID#=2 has communication quality which is second highest, no priority rank is assigned to beam direction ID#=2 because beam direction ID#=2 is adjacent to beam direction ID#=1 which has the first highest communication quality. As a result, priority rank 1 is assigned to beam direction ID#=1, and priority rank 2 is assigned to beam direction ID#=4 (under the assumption that communication quality scores of beam direction ID#=4 to 14 are lower than communication quality score 4). Thereafter, assignments of priority rank can be made in the same manner, if necessary. After setting of the priority rank, general communication process starts in step 407.

Hereinafter, the reason why no priority rank is assigned to the beam direction ID adjacent to the beam direction in which a priority rank has been already assigned, or why the priority rank of the beam direction which is not adjacent to the beam direction is lowered, will be described.

FIG. 7a to FIG. 7d are views explaining, in the process shown in FIG. 5, the reason why no priority rank is assigned to the beam direction adjacent to the beam direction in which a priority rank has been already assigned.

Figure 7A:
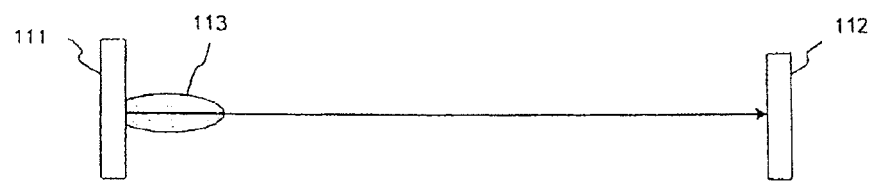
FIG. 7a is a view explaining, in a process shown in FIG. 5, the reason why no priority rank is assigned to the beam direction adjacent to the beam direction in which a priority rank has been already assigned.
Figure 7B:
FIG. 7b is a view explaining, in the process shown in FIG. 5, the reason why no priority rank is assigned to the beam direction adjacent to the beam direction in which a priority rank has been already assigned.

FIG. 7a shows the case in which no obstacle exists between transmitter antenna 111 and receiver antenna 112 and communication is carried out from transmitter antenna 111 to receiver antenna 112 by a direct wave. Beam pattern 113 of transmitter antenna 111 is oriented toward receiver antenna 112. FIG. 7b shows the beam pattern of the beam direction which is adjacent to the beam direction shown in FIG. 7a, wherein the beam pattern shown in FIG. 7b has an angle slightly different from that of the beam pattern shown in FIG. 7a. Here, no problem arises in carrying out a communication even though the wave receiving level in FIG. 7b is a little lower than that shown in FIG. 7a.

Figure 7C:
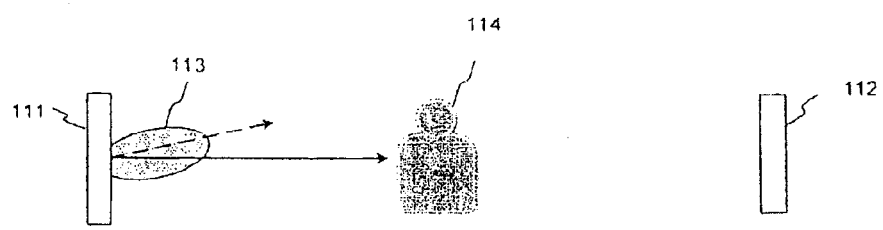
FIG. 7c is a view explaining, in the process shown in FIG. 5, the reason why no priority rank is assigned to the beam direction adjacent to the beam direction in which a priority rank has been already assigned.
Figure 7D:
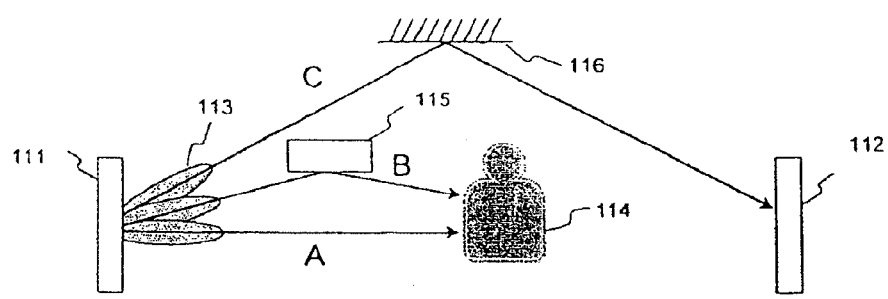
FIG. 7d is a view explaining, in the process shown in FIG. 5, the reason why no priority rank is assigned to the beam direction adjacent to the beam direction in which a priority rank has been already assigned.

However, as shown in FIG. 7c, in the case where human body 111 exists in a transmission line, communication cannot be carried out even though the beam pattern from transmitter antenna 111 is oriented toward receiver antenna 112 or set at an angle with respect to the direction leading to receiver antenna 112. In addition, as shown in FIG. 7d, in the case where a direct wave(A) is blocked by an obstacle (for example, a human body), there is very little probability that communication can be carried out even when a transmission line formed by a reflected wave(B) reflected at reflector 115 exists in the beam direction adjacent to the beam direction of the direct wave. This is because transmission is performed through a spatially closer path and both the transmission line formed by the direct wave and the transmission line formed by the reflected wave are blocked at the same time.

Meanwhile, since transmission line that is formed in the beam direction of a reflected wave(C) reflected at ceiling 116 or the like is spatially far from the transmission line formed in the beam direction of the direct wave(A), it is not likely that the two transmission lines will be blocked at the same time. In the operation described above, it is assumed that both the transmitter and the receiver are in a quasi-stop state and the transmission state changes locally only around the area where the obstacle (i.e., human body in this case) exists. That is, the unblocked transmission line is kept in the unchanged state. This is particularly effective in the radio wave in a millimeter wave band which has good property for advancing in a straight line and the arrival direction thereof can be clearly isolated.

Now, beam forming in the beam direction which is set in accordance with the thus-assigned priority rank will be discussed.

Figure 8:
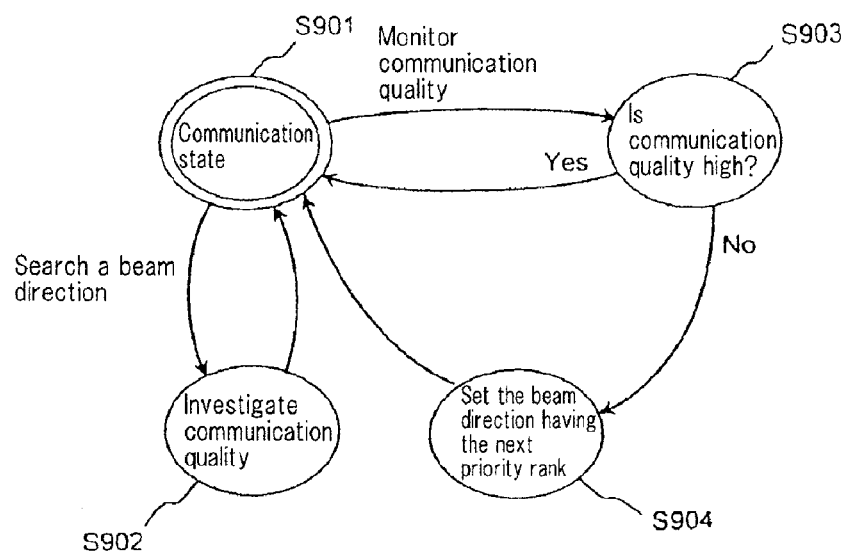
FIG. 8 is a view showing the state of beam forming in a radio control method of the present invention.
Figure 9:
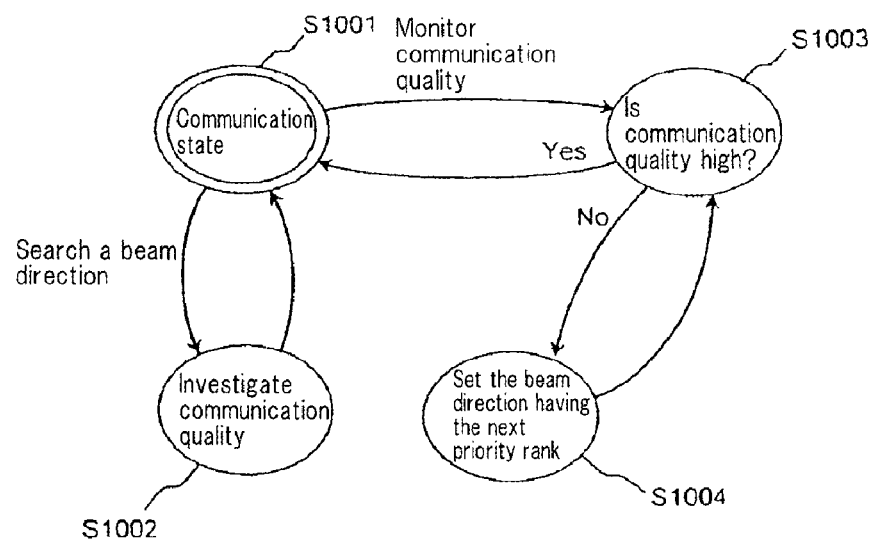
FIG. 9 is a view showing the state of beam forming in a radio control method of the present invention.

FIGS. 8 and 9 show the state of beam forming in a radio control method of the present invention.

As shown in FIG. 8, it is kept in a communication state if it is normal (S901), but communication quality is conformed by performing the above-described process at predetermined intervals or by repeating the process if the process is triggered (S902), and the data string shown in FIG. 6 and the priority rank of the beam direction based on the data string are updated. In addition, the communication quality is monitored (S903), and the communication state is kept as is if communication quality is good, however, if communication quality is judged as bad, the beam direction having the next priority rank is set (S904), and it returns to the communication state (S901).

The state of beam forming shown in FIG. 9 differs from the state shown in FIG. 8 only in that the beam direction having the next priority rank is set (S1004), and it returns to a communication state (S1001) after judgment of the communication quality (S1003). Owing to this, the communication quality can be checked whether it is good or not (S1003) prior to returning to the communication state (S1001). That is, the beam forming is constituted by processes of searching for beam directions in accordance with the priority rank.

In addition, if the communication quality is judged as having suddenly deteriorated as a result of monitoring of the communication quality (S903 or S1003), it may be desirable that the beam direction having the next priority rank is set before communication quality deteriorates further. In monitoring communication quality (S903 or S1003), it may be desirable that the communication quality of the beam direction having a high priority rank as well as the beam direction currently being used in a communication be monitored, and if needed, communication quality information is investigated (S902 or S1002) to be used as a trigger for updating the data stream. In this case, a significant increase in the amount of time needed to monitor communication quality can be avoided because the beam direction that is to be monitored is limited.

According to the radio control method of this exemplary embodiment, if communication quality is deteriorated by blocking or the like caused by an obstacle, the next beam direction is determined in advance by taking into account the propagation environment of the millimeter wave (or microwave of approximately 10 GHz or higher in which the property of a radio wave to advance in a straight line gets higher), thereby making it possible to reduce time taken for setting the beam direction and data transmission interrupt time.

The radio control method is effective in an indoor millimeter wave (or microwave of approximately 10 GHz or higher in which the property of a radio wave to advance in a straight line gets higher), which can be explained as follows.

The transmission lines which can be provided for communication are limited, and are formed by a direct wave and a reflected wave reflected from a wall, window and other obstacles. For this reason, each transmission line has an emanating angle and a receiving angle which significantly vary in accordance with waves to be emanated or received. However, as regards a radio wave with a poor property for advancing in a straight line, for example, a microwave band of 2.4 GHz, an antenna having directivity may not be commonly used due to multiple scattering or diffraction effects. Although there is an example of development in an adaptive antenna having a directivity to eliminate interference, it is easy to ensure superior communication quality at the angle of the direct wave or the angle approximate thereto owing to diffraction effects.

As described so far, the radio control method of the present invention exhibits effective performance only in the radio system which uses a directivity antenna and a millimeter wave where the straight line advancing property of radio wave becomes higher (or a microwave of approximately 10 GHz or higher).

Meanwhile, in this exemplary embodiment, it may be desirable that no priority rank is assigned to the beam direction adjacent to the beam direction in which a priority rank has been already assigned, however, if a beam direction is finely divided, no priority rank will be assigned to the adjacent beam direction having the beam direction adjacent to beam direction in which a priority rank has been already assigned.

Second Exemplary Embodiment

Figures 10, 11:
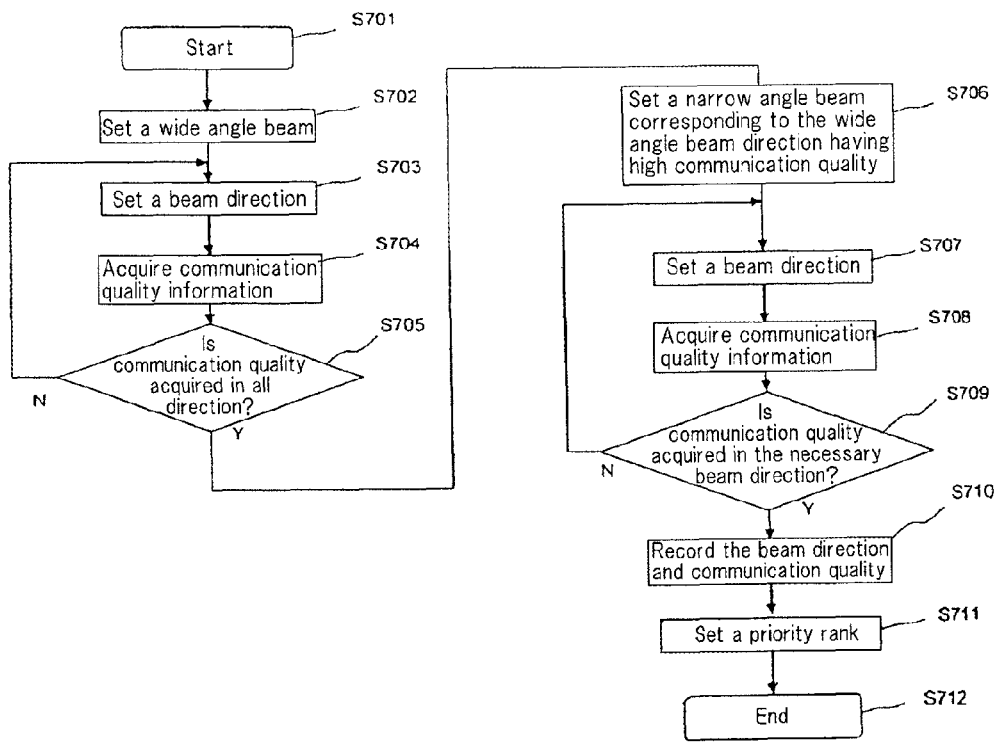
FIG. 10 shows a table of data string set in a communication control method according to the second exemplary embodiment of the present invention.
FIG. 11 is a flowchart showing a process of a radio control method according to the third exemplary embodiment of the present invention.

FIG. 10 shows a table of data string set in a communication control method according to the second exemplary embodiment of the present invention.

The method of the second exemplary embodiment differs from the method of the first exemplary embodiment only as regards priority ranking described with reference to FIG. 6, but the steps for setting beam directions and investigating communication quality in those beam directions described with reference to FIG. 5, or the state of beam forming in a radio communication system described with reference to FIGS. 8 and 9, can be applied to the second exemplary embodiment.

As shown in FIG. 10, in the second exemplary embodiment, the angle of the beam with respect to the beam direction having the highest priority rank (i.e., beam direction ID #=1 in FIG. 10) is considered, and if the thus-considered angle of the beam is small, the weighting level is set to low. That is, in this exemplary embodiment, ID #=4 has communication quality that is lower than that of ID #=2, but has an angle that is larger than that of ID #=2 with respect to the beam direction having the highest priority rank, and therefore, the weighting coefficient thereof is set large. Thus, weighted communication quality obtained from thus-set weighting coefficient and communication quality is improved to make the priority rank higher. Meanwhile, the degree of freedom for setting a beam direction increases because a wide variety of weighting methods or functions are allowed. Accordingly, similarly to the first exemplary embodiment, an essential factor of this exemplary embodiment is to lower the priority rank of at least the adjacent beam, which achieves similar effects as the first exemplary embodiment.

The Third Exemplary Embodiment

FIG. 11 is a flowchart showing a process of a radio control method according to the third exemplary embodiment of the present invention.

In the third exemplary embodiment, a process starts in step 701, and a wide angle beam is set in step 702. Subsequently, the wide angle beam direction is set in step 703, and communication quality in the beam direction is obtained in step 704.

In subsequent step 705, steps 703 and 704 are repeated until communication quality is realized in all directions of beam control.

Subsequently, in step 706, a narrow angle beam is set so as to be limited only in the direction corresponding to the highest communication quality range in a wide angle beam. In step 707, the narrow angle beam is set in the thus-limited direction, and in step 708, communication quality information in the set beam direction is realized. In subsequent step 709, steps 707 and 708 are repeated until communication quality is realized in all directions of beam control.

In step 710, the result is recorded as a data string constituted by the beam direction and communication quality in the beam direction.

FIG. 12 shows a table of data string acquired from the process shown in FIG. 11.

As shown in FIG. 12, a data string constituted by the beam direction (assigned with ID numbers matching a wide angle beam and a narrow angle beam) and communication quality in the beam direction is acquired and recorded.

In step 711, a priority rank is assigned to the beam direction in order to set the beam direction that is required for carrying out radio communication, according to the data string shown in FIG. 12, and the process ends in step 712.

In this exemplary embodiment, regarding the direction of the narrow angle beam, there is no need to search all directions in which narrow beam control is performed, since only the direction having high communication quality is searched in the wide angle beam. This significantly reduces time taken for searching. For example, if the number of searches in a wide angle beam is 8 and the number of searches in a narrow angle beam is 16 (by range unit corresponding to one wide angle beam), the number of searches to be performed in the narrow angle beam is 128 (=8×16). However, in this exemplary embodiment, the number of searches to be performed in the narrow angle beam is just 24 (=8+16) and one-fifth. As shown in FIG. 12, in the case where a predetermined receiving level (or communication quality) is not obtained in the wide angle beam, search in the matched narrow angle beam is not performed, to thereby reduce time taken to search for the beam direction.

Meanwhile, the wide angle beam as used herein is one having a coverage wider than that of the narrow angle beam, which reduces time taken to search for the beam direction. In addition, at least either a transmitter side or a receiver side may perform searching in the wide angle beam and searching in the narrow angle beam, and effects of the present invention will occur in either case. As means for forming the wide angle beam and the narrow angle beam, an adaptive array antenna, a plurality of antennas, and a sector antenna can be employed, however, the present invention is not limited by any of these.

In this exemplary embodiment, similarly to the first and second exemplary embodiments, the next beam direction is determined in advance to reduce data transmission interrupt time, and to thereby reduce the time taken for searching beam direction for assignment of priority rank.

In the meantime, processes of the above-described three exemplary embodiments are performed by the antenna beam control mechanism in a transmitter and a receiver. The antenna beam control mechanism in the transmitter sets the beam direction of the transmitter, and the antenna beam control mechanism in the receiver sets the beam direction of the receiver, however, such an antenna beam control mechanism can be employed in a method for setting beam directions in both the transmitting and receiving sides. A data string constituted by beam directions on the transmitting side and receiving side and the communication quality matched thereto, is recorded in one or both of the transmitter and the receiver. In this case, effects of the present invention are further improved, since the number of beam directions is calculated by multiplying a transmitting beam and a receiving beam.

Although the term "communication quality" is used in three exemplary embodiments described above, any of the terms, for example, a receiving level, a signal-to-noise ratio (SNR), a bit error rate (BER), a packet error rate (PER), a frame error rate (FER) and so on can be used, and one or combination thereof may be used. A specific data string in a preamble can be used in evaluating communication quality.

The Fourth Exemplary Embodiment

In the first to third exemplary embodiments, the transmitter side or the receiver side having a function for setting a beam direction assigns beam directions having a priority rank. In the fourth exemplary embodiment, assumptions are made for the case where a receiver sends an instruction to a transmitter having a function for setting a beam direction, the case where a transmitter sends an instruction to a receiver having a function for setting a beam direction, or the case where both of a transmitter and a receiver have beam direction set functions and control beam directions in accordance with relative beam directions, beam angles and beam quality of both the transmitter and receiver. In this case, a step is added to transmit beam directions, beam angles and communication quality information from the transmitter to the receiver or from the receiver to the transmitter.

In this case, the process sequence shown in FIG. 5 and the data string shown in FIG. 6, FIG. 10 or FIG. 11 can be used, however, in the data string, adjacent beam directions define beam angles.

In the case where both the transmitter and the receiver have a function for setting a beam direction, it is required that either the transmitter or the receiver transmits information defining the corresponding beam direction and beam angle to the other transmitter and to the receiver, and the data string shown in FIG. 13, for example, can be employed to assign beam directions having a priority rank.

Although beam directions and beam angles are defined explicitly in the fourth exemplary embodiment, it may be possible to replace the numbers denoting beam directions by any other control means. The beam angle represented as an absolute value can be replaced by a relative value from a specific beam direction. Further, it is possible to use a function for defining beam directions and beam angles, and methods for expressing beam directions or beam angles are not limited.

As described above, a radio control method in a communication system using a millimeter wave according to exemplary embodiments of the present invention makes it possible to set beam directions in a rapid manner, by using beam angle information as well as beam direction and communication quality information.

While the present invention has been described with reference to particular embodiments thereof, it is not limited to those embodiments. It will be understood by those skilled in the art that various changes may be made to the configuration or detailed description of the present invention within from the scope of the invention.

The invention claimed is:

1. A radio control method for a radio communication being performed in beam directions including a first beam direction, a second beam direction and a third beam direction that are set on the basis of communication quality, the method comprising:
a step of acquiring a data string formed of information of at least the beam directions and communication quality in the beam directions;
a step of assigning a priority ranks including a first priority rank and a second priority rank lower than the first priority rank to the beam directions according to the data string, in order to set the beam directions for performing the radio communication in each of the beam directions which are determined by the communication quality; and
sequentially assigning a priority rank in order to set the beam direction for performing the radio communication in the beam direction in which the highest communication quality is obtained, according to the data string,
wherein the step of assigning a priority rank does not assign priority rank to the beam direction adjacent to the beam direction to which a priority rank has already been assigned, or the beam direction in the vicinity where the adjacent beam direction is present.

2. A radio control method for a radio communication being performed in beam directions including a first beam direction, a second beam direction and a third beam direction that are set on the basis of communication quality, the method comprising:
a step of acquiring a data string formed of information of at least the beam directions and communication quality in the beam directions; and
a step of assigning a priority ranks including a first priority rank and a second priority rank lower than the first priority rank to the beam directions according to the data string, in order to set the beam directions for performing the radio communication in each of the beam directions which are determined by the communication quality,
wherein the step of assigning the priority ranks assigns the second priority rank and a third priority rank lower than the second priority rank to the beam directions other than the first beam direction according to weighting communication quality obtained from: (1) a weighting coefficient which is set lower as an angle with respect to the first beam direction becomes smaller, and (2) the communication quality.

3. The radio control method according to claim 1, comprising a step of acquiring communication quality in a wide angle beam direction by using a wide angle beam, wherein the method acquires a data string formed of the beam direction and communication quality in the beam direction, by using a narrow angle beam set with respect to the wide angle beam direction having a highest communication quality.

4. The radio control method according to claim 1, comprising a step of setting a beam direction according to the priority rank, and a step of performing a radio communication in the set beam direction.

5. The radio control method according to claim 4, comprising:
a step of monitoring communication quality in the beam direction in which the radio communication is being performed; and
a step of changing the beam direction to the beam direction in which the next priority rank is assigned and continuously performing the radio communication, if the communication quality changes.

6. The radio control method according to claim 5, wherein the method monitors communication quality in the beam direction having a priority rank second to that of the beam direction in which the radio communication is being performed during the step of monitoring communication quality.

7. The radio control method according to claim 1, wherein the priority rank is updated by repeating a step of acquiring a data string formed of communication quality in the beam direction.

8. The radio control method according to claim 1, wherein the radio communication uses a radio wave having a frequency of 10 GHz or higher.

9. The radio control method according to claim 1, a radio communication being performed by at least a transmitter or a receiver in a beam direction set on the basis of communication quality, comprising transmitting information defining at least a plurality of beam directions and information defining angles of each beam direction from the transmitter to the receiver or from the receiver to the transmitter.

10. The radio control method according to claim 9, comprising:
   a step of acquiring a data string containing communication quality in the beam direction; and
   a step of sequentially assigning a priority rank in order to set the beam direction for performing the radio communication from the beam direction in which the highest communication quality is obtained, according to the information defining the beam direction, information defining the angle of the beam direction, and the data string.

11. The radio control method according to claim 10, wherein the step of assigning a priority rank does not assign priority rank to, or lowers the priority rank of the beam direction adjacent to the beam direction to which a priority rank has already been assigned, or the beam direction in the vicinity where the adjacent beam direction is present.

* * * * *